(12) United States Patent
Zhao et al.

(10) Patent No.: US 11,997,282 B2
(45) Date of Patent: May 28, 2024

(54) IMAGE PROCESSING METHOD AND APPARATUS FOR MOBILE PLATFORM, MOBILE PLATFORM, AND MEDIUM

(71) Applicant: SZ DJI TECHNOLOGY CO., LTD., Shenzhen (CN)

(72) Inventors: Liang Zhao, Shenzhen (CN); Wenyi Su, Shenzhen (CN); Shizhen Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 30 days.

(21) Appl. No.: 17/708,004

(22) Filed: Mar. 30, 2022

(65) Prior Publication Data
US 2022/0224906 A1   Jul. 14, 2022

Related U.S. Application Data

(63) Continuation of application No. PCT/CN2019/109442, filed on Sep. 30, 2019.

(51) Int. Cl.
*H04N 19/134* (2014.01)
*G06F 3/01* (2006.01)
(Continued)

(52) U.S. Cl.
CPC .......... *H04N 19/134* (2014.11); *G06F 3/013* (2013.01); *H04N 19/117* (2014.11); *H04N 19/124* (2014.11); *H04N 19/36* (2014.11)

(58) Field of Classification Search
CPC .. H04N 19/134; H04N 19/117; H04N 19/124; H04N 19/36; H04N 19/119;
(Continued)

(56) References Cited

U.S. PATENT DOCUMENTS 5,790,839 A * 8/1998 Luk .................. G11C 5/025
713/300
5,901,304 A * 5/1999 Hwang ............... G11C 7/22
365/230.06
(Continued)

FOREIGN PATENT DOCUMENTS

CN          104427337 A      3/2015
CN          105049850 A      11/2015
(Continued)

OTHER PUBLICATIONS

International Search Report and Written Opinion dated Jun. 23, 2020, received for PCT Application PCT/CN2019/109442, Filed on Sep. 30, 2019, 11 pages including English Translation.
(Continued)

*Primary Examiner* — Frank F Huang
(74) *Attorney, Agent, or Firm* — XSENSUS LLP

(57) ABSTRACT

An image processing method and apparatus for a mobile platform, a mobile platform, and a medium. The image processing method may include acquiring a current image to be encoded; acquiring an encoding quality evaluation parameter of an encoded historical image and a network state evaluation parameter of a wireless communication link, wherein the encoded historical image may be sent to a receiving end through the wireless communication link; and based on the encoding quality evaluation parameter and the network state evaluation parameter, determining whether to execute a target area image processing algorithm on the current image.

20 Claims, 5 Drawing Sheets

(51) Int. Cl.
*H04N 19/117* (2014.01)
*H04N 19/124* (2014.01)
*H04N 19/36* (2014.01)

(58) Field of Classification Search
CPC .. H04N 19/146; H04N 19/154; H04N 19/167;
H04N 19/174; G06F 3/013; G06F 3/012
See application file for complete search history.

(56) References Cited

U.S. PATENT DOCUMENTS

| | | | | |
|---|---|---|---|---|
| 6,072,834 A * | 6/2000 | Kim | | H04N 19/51 |
| | | | | 382/250 |
| 6,097,756 A * | 8/2000 | Han | | H04N 19/543 |
| | | | | 375/240 |
| 6,580,754 B1 * | 6/2003 | Wan | | H04N 19/33 |
| | | | | 375/E7.079 |
| 6,728,317 B1 * | 4/2004 | Demos | | H04N 19/36 |
| | | | | 348/E7.015 |
| 6,765,962 B1 * | 7/2004 | Lee | | H04N 19/124 |
| | | | | 375/240.03 |
| 6,771,703 B1 * | 8/2004 | Oguz | | H04N 19/59 |
| | | | | 375/240.03 |
| 6,826,232 B2 * | 11/2004 | Chen | | H04N 19/14 |
| | | | | 375/240.18 |
| 7,016,412 B1 * | 3/2006 | van Zon | | H04N 19/156 |
| | | | | 375/240.1 |
| 7,095,782 B1 * | 8/2006 | Cohen | | H04N 21/2404 |
| | | | | 375/E7.02 |
| 7,245,662 B2 * | 7/2007 | Piche | | H04N 19/46 |
| | | | | 382/250 |
| 7,263,124 B2 * | 8/2007 | Peng | | H04N 19/34 |
| | | | | 375/240.03 |
| 7,369,610 B2 * | 5/2008 | Xu | | H04N 21/234327 |
| | | | | 375/E7.091 |
| 7,391,807 B2 * | 6/2008 | Lin | | H04N 19/40 |
| | | | | 375/240.03 |
| 7,477,688 B1 * | 1/2009 | Zhang | | H04N 19/40 |
| | | | | 375/240 |
| 7,627,034 B2 * | 12/2009 | Park | | H04N 19/46 |
| | | | | 375/240.08 |
| 7,697,608 B2 * | 4/2010 | Lee | | H04N 19/14 |
| | | | | 375/240.03 |
| 7,729,421 B2 * | 6/2010 | Campisano | | H04N 19/577 |
| | | | | 375/240.01 |
| 8,040,952 B2 * | 10/2011 | Park | | H04N 21/4347 |
| | | | | 375/240.01 |
| 8,189,659 B2 * | 5/2012 | Han | | H04N 21/43637 |
| | | | | 375/240.02 |
| 8,494,042 B2 * | 7/2013 | Park | | H04N 19/513 |
| | | | | 375/240 |
| 2003/0202581 A1 | 10/2003 | Kodama | | |
| 2007/0053620 A1 | 3/2007 | Mizuno | | |
| 2007/0064791 A1 * | 3/2007 | Okada | | H04N 19/63 |
| | | | | 375/E7.125 |
| 2009/0028245 A1 * | 1/2009 | Vieron | | H04N 19/109 |
| | | | | 375/E7.123 |
| 2011/0243231 A1 * | 10/2011 | Li | | H04N 19/187 |
| | | | | 375/E7.256 |
| 2011/0268175 A1 * | 11/2011 | Tan | | H04N 19/895 |
| | | | | 375/E7.026 |
| 2013/0028324 A1 * | 1/2013 | Chang | | H04N 19/433 |
| | | | | 375/E7.125 |
| 2014/0092970 A1 * | 4/2014 | Misra | | H04N 19/52 |
| | | | | 375/240.16 |

FOREIGN PATENT DOCUMENTS

| | | |
|---|---|---|
| CN | 105049949 A | 11/2015 |
| CN | 105516721 A | 4/2016 |
| CN | 106131670 A | 11/2016 |
| CN | 106572351 A | 4/2017 |
| CN | 106791910 A | 5/2017 |
| CN | 109862356 A | 6/2019 |
| CN | 109949381 A | 6/2019 |
| JP | 2019-140575 A | 8/2019 |

OTHER PUBLICATIONS

Zhao et al., "Region-of-interest based rate control for UAV video coding", Optoelectronics Letters, vol. 12, No. 3., May 1, 2016, pp. 1-5.

* cited by examiner

IMAGE PROCESSING METHOD AND APPARATUS FOR MOBILE PLATFORM, MOBILE PLATFORM, AND MEDIUM

CROSS-REFERENCE TO RELATED APPLICATION

The present application is a continuation of International Application No. PCT/CN2019/109442, filed Sep. 30, 2019, the entire content of which is incorporated herein by reference in its entirety.

TECHNICAL FIELD

The present disclosure relates to the technical field of image processing, particularly to an image processing method and apparatus for a mobile platform, a mobile platform, and a medium.

BACKGROUND

Along with continuous development of the image processing technology, while realizing real-time wireless transmission of images, more and more attention has been paid to clarity of images transmitted through the real-time wireless transmission. Since achieving the real-time wireless transmission of high-definition images have high requirements on channel quality of wireless communication links, if it is based on channels with limited bandwidth, the requirement on the clarity of images transmitted through the real-time transmission would not be met. As a result, to adapt to limited transmission bandwidth, real-time transmission of images in the prior art usually uses an encoding method based on a target area image to ensure clarity of the target area image (i.e., Region of Interest, ROI) of an image in a transmission process.

SUMMARY OF THE DISCLOSURE

Due to the related art technique described above, embodiments of this disclosure provide an image processing method for a mobile platform and a mobile platform, which may improve the flexibility of the non-uniform code rate allocation algorithm based on a target area image in an image.

One embodiment of the present disclosure discloses an image processing method for a mobile platform. The method may comprise: acquiring a current image to be encoded; acquiring an encoding quality evaluation parameter of an encoded historic image or a network state evaluation parameter of a wireless communication link, wherein the encoded historical image being sent to a receiving end through the wireless communication link; and according to the encoding quality evaluation parameter or the network evaluation parameter, deciding whether to execute a target area image processing algorithm on the current image. The target area image processing algorithm may be used to: determine a target area image from the current image, adopt a first quantization parameter to encode the target area image, and adopt a second quantization parameter which is greater than the first quantization parameter to encode the image outside of the target area image in the current image; alternatively, the target area image processing algorithm may be used to: adopt a first filter to filter the target area image, adopt a second filter to filter the image outside of the target area image, and encode the filtered target area image and the filtered image outside of the target area image, wherein the filter strength parameter of the first filter is smaller than that of the second filter.

One embodiment of the present disclosure discloses an image processing apparatus for a mobile platform. The mobile platform may communicatively connect with a receiving end through a wireless communication link. The apparatus may comprise a memory and a processor. The memory may be used to store program instructions. The processor may be used to call the program instructions to perform the following operations: acquiring a current image to be encoded; acquiring an encoding quality evaluation parameter of an encoded historic image or a network evaluation parameter of a wireless communication link, wherein the encoded historical image being sent to the receiving end through the wireless communication link; and according to the encoding quality evaluation parameter or the network evaluation parameter, determining whether to execute a target area image processing algorithm on the current image, wherein the target area image processing algorithm may be used to: determine a target area image from the current image, adopt a first quantization parameter to encode the target area image, and adopt a second quantization parameter which is greater than the first quantization parameter to encode the image outside of the target area image in the current image; alternatively, adopt a first filter to filter the target area image, adopt a second filter to filter the image outside of the target area image in the current image, and encode the filtered target image area and the filtered image area outside of the target area, wherein the filter strength parameter of the first filter is smaller than that of the second filter.

One embodiment of the present disclosure discloses a mobile platform. The mobile platform may comprise a fuselage, a power system which may be installed inside of the fuselage and may provide motivation for the mobile platform, and a processor as described in any feature of the second embodiment.

One embodiment of the present disclosure discloses a computer storage medium. The computer storage medium may store computer program codes. When the computer program codes are executed by a processor, it may execute an image processing method for a mobile platform as described in the first embodiment.

According to some embodiments of this disclosure, a mobile platform may determine whether to execute a target area image processing algorithm on a current image according to an encoding quality evaluation parameter of an encoded historical image or a network state evaluation parameter of a wireless communication link. In this way, it is possible to determine to execute a target area image processing algorithm on a current image according to an encoding quality evaluation parameter of an encoded historical image or a network evaluation parameter of a wireless communication link, or to determine not to execute a target area image processing algorithm on a current image, which may enable the selected image processing method to be more suitable for the current application scenario and may improve the flexibility of image processing.

BRIEF DESCRIPTION OF THE DRAWINGS

To clearly illustrate embodiments of the present disclosure or technical solutions in existing technologies, the drawings needed in some embodiments are briefly described below. Obviously, the drawings in the description below are some embodiments of the disclosure, for people with ordi

DETAILED DESCRIPTION

Figure 1A:
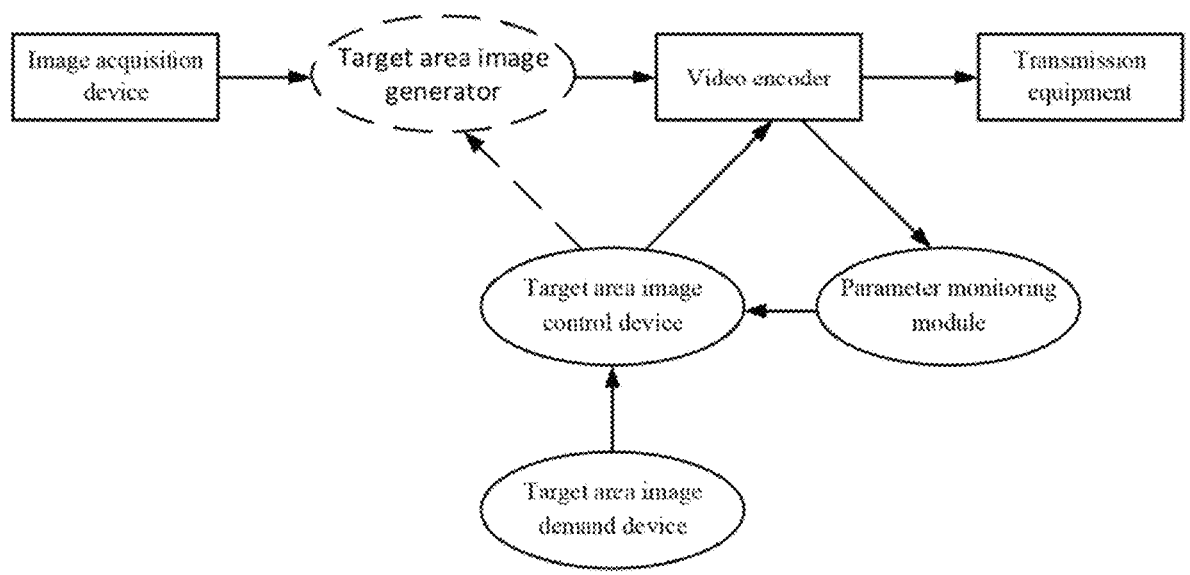
- FIG. 1a is a schematic flowchart of an image processing method for mobile platform according to one embodiment of the present disclosure.

The technical solutions and technical features encompassed in the exemplary embodiments of the present disclosure will be described in detail in conjunction with the accompanying drawings in the exemplary embodiments of the present disclosure. Apparently, the described exemplary embodiments are part of embodiments of the present disclosure, not all of the embodiments. Based on the embodiments and examples disclosed in the present disclosure, all other embodiments obtained by those of ordinary skill in the art without inventive efforts shall fall within the protection scope of the present disclosure.

Here, exemplary embodiments will be described in detail, and examples thereof are shown in the accompanying drawings. The implementation manners described in the following exemplary embodiments do not represent all implementation manners consistent with the present disclosure. On the contrary, they are only examples of devices and methods consistent with some aspects of the disclosure as detailed in the appended claims. Further, the chart(s) and diagram(s) shown in the drawings are only examples, and does not necessarily include all components, elements, contents and/or operations/steps, nor does it have to be arranged in the described or specific order. For example, certain steps of the method may be performed in other orders or at the same time; some components/elements can also be disassembled, combined, or partially combined; therefore, the actual arrangement may be changed or modified according to actual conditions. In the case of no conflict, the components, elements, operations/steps, and other features disclosed in the embodiments may be combined with each other.

Current image processing method based on a target area image primarily uses a non-uniform rate allocation algorithm, that is, more bandwidths being allocated to the target area image in a frame of an image and less bandwidth being allocated to the image outside the target area image. As such, image quality of the target area image is clearer, while image quality of the image outside the target area image is blurry. This method may sacrifice the quality of image outside the target area image to ensure the quality of the target area image. However, since the image source and the network state of a wireless communication link transmitting the image change constantly, when the network state of the wireless communication link is good, the image processing method based on a target area image may not increase the image quality outside the target area image quickly or noticeably.

Real-time image/video transmission system has a high requirement on image transmission delays. However, transmission bandwidths are limited. As a result of meeting the requirement on the image quality of the target area image in a transmission image (i.e., current image), the transmission image may be divided into different areas based on the target area image (i.e., the image corresponding to ROI). According to the importance associated with different image areas which may be determined based on the area division, different image processing methods may be used to process different image areas in the same image so that different image areas in the same transmission image correspond to different requirements on image quality, which may improve utilization rate of limited transmission bandwidth. That is, after the transmission image being divided into different areas, the image quality of the decoded image of the target area image after being transmitted is clearer, while the image quality of the decoded image of the image outside the target area image after being transmitted is lower than that of the target area image. Thus, the transmission is not conducted so as to keep the image quality of different areas of the transmitted image uniform.

Due to the information source of an image and the network state of a wireless communication link that transmits the image change constantly, a non-uniform code rate allocation algorithm is always turned on in existing technology. In this way, even when the network state of a wireless communication link is good, an image processing method based on a target area image may still not improve the quality of the image outside the target area image noticeably or quickly. The existing strategy may not be flexibly adapted to various application scenarios.

One embodiment of the present disclosure discloses an image processing method for a mobile platform, as shown in FIG. 1. Main apparatus modules executing the image processing method may comprise an image acquisition device, a video encoder, a transmission equipment, a parameter monitoring module, a target area image control device, and a target area image demand device. The mobile platform may communicatively connect with a receiving end through a wireless communication link.

In one embodiment, the image acquisition device may be used for image acquisition. The parameter monitoring module may be used to collect the encoding quality evaluation parameter of an encoded historical image or the network state evaluation parameter of a wireless communication link. The target area image demand device may be used to receive the feedback on the image division demand of the target area image (image corresponding to ROI) from a user or a receiving end. The target area image control device is the core algorithm module, which may determine whether to execute a target area image processing algorithm on a current image according to an encoding quality evaluation parameter or a network state evaluation parameter. If it is determined to execute the target area image processing algorithm on the current image, the target area image control device may determine the image division for the image (that is, to determine the target image area and the image outside the target area image in the acquired image) according to the target area image division requirement provided by the target area image demand device, and may determine an control approach for an encoder. According to the target area image and the control approach of the encoder determined by the target area image control device, the encoder is responsible for encoding the image, controlling the bit rate, and adapting the transmission bandwidth, etc. In some embodiments, if the target area image control device determines not to execute the target area image processing algorithm on the current image, the encoder may encode by following encoding strategy of performing bit rate allocation on the entire frame of the image in existing technology. The transmission equipment may be used to transmit encoded images. The receiving end may be one or more of the following: a remote control, a smart phone, a tablet computer, a laptop, and a wearable device (such as watch, bracelet, and video glasses).

Optionally, the parameter monitoring module may measure the encoding quality evaluation parameter of an encoded historical image during an image encoding process. The encoding quality evaluation parameter may be determined based on one or more of the following: Quantization Parameter (QP), Peak Signal to Noise Ratio (PSNR), Mean Square Error (MSE), or Structural Similarity Index (SSIM). The parameter monitoring module may also measure the network state evaluation parameter of a current channel (i.e., wireless communication link), such as at least one of following: a channel bandwidth, a bit error rate, or data volume of the image in the buffer of a mobile platform to be sent to a receiving end. Furthermore, the encoding quality evaluation parameter of an encoded historical image may include an average or median value of encoding quality evaluation parameters of the macroblocks in the encoded historical image. The mobile platform may determine whether to execute a target area image processing algorithm on the current image according to the acquired encoding quality evaluation parameter or network state evaluation parameter. Wherein a predefined function f: f (quantization parameter, peak signal to noise ratio, mean square error, or structural similarity index) or g: g (channel bandwidth, bit error rate, image resolution, frame rate, or data volume) in the mobile platform may determine whether to execute the target area image processing algorithm on the current image.

The target area image control device may determine to execute the target area image processing algorithm on an image when meeting at least one of the following first-conditions, which may include: channel bandwidth is less than or equal to a preset first bandwidth threshold, the data volume of the image in the buffer of the mobile platform to be sent to the receiving end is greater than or equal to a preset first data volume threshold, the quantization parameter of an encoded historical image is greater than or equal to a preset first quantization parameter threshold, and the peak signal-to-noise ratio of an encoded historical image is less than or equal to a preset first peak signal-to-noise ratio threshold. A target area image control device may determine not to execute the target area image processing algorithm on an image when meeting at least one of the following second-conditions, which may include: channel bandwidth is greater than a preset second bandwidth threshold, the data volume of the image in the buffer of the mobile platform to be sent to the receiving end is less than a preset second data amount threshold, the quantization parameter of an encoded historical image is less than a preset second quantization parameter threshold, and the peak signal-to-noise ratio of an encoded historical image is greater than a preset second peak signal-to-noise ratio threshold.

Figure 1B:
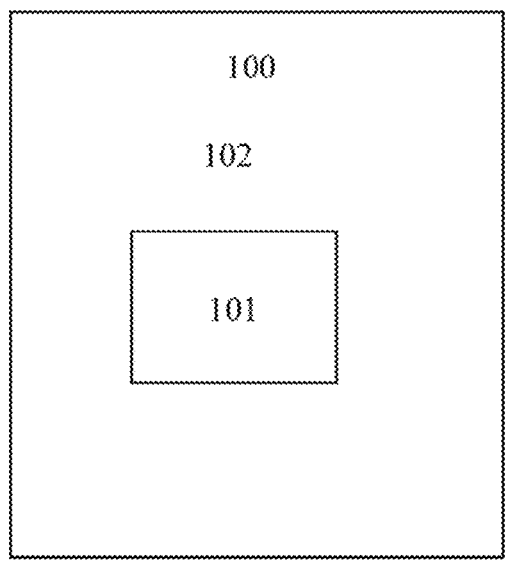
FIG. 1b is a schematic diagram of determining multiple target image areas from an image according to one embodiment of the present disclosure.

In one embodiment, when a target area image processing algorithm is applied to an image, a target area image control device may determine one or multiple target area images in the image. As shown in FIG. 1b, a target area image control device may determine the target area image 101 and the image outside the target area image 102 from a current image to be encoded 100. The target area image control device may determine a first quantization parameter of the target area image 101 and a second quantization parameter of the image outside the target area image 102. A video encoder may use the first quantization parameter to encode the target area image and use the second quantization parameter which is greater than the first quantization parameter to encode the image outside the target area image in the current image. In some embodiments, the target area image control device may use a first filter to filter the target area image, use a second filter to filter the image outside the target area image in the current image, and encode the filtered target area image and the filtered image outside the target area image, wherein a filter strength parameter of the first filter is smaller than that of the second filter. A video encoder may encode the current image after being filtered. Optionally, the video encoder may use the same quantization parameter to encode the current image after being filtered. It is understandable that the larger the filter strength parameter of the filter, the more blurred the image after being filtered.

As described above, according to the encoding quality of an encoded historical image or the communication quality of a communication link, a method of determining whether to execute the target area image processing algorithm on the current image is determined. In this way, when the encoding quality of an encoded historical image is relatively high or the communication quality of a wireless communication link is relatively good, the quality of the image outside the target area image may be increased noticeably and quickly, thus effectively improving the image quality of the decoded image. When the encoding quality of an encoded historical image is relatively high or the communication quality of a wireless communication link is relatively good, it may ensure quality and definition of the target area image in the current image, which may improve flexibility of the image processing.

Figure 1C:
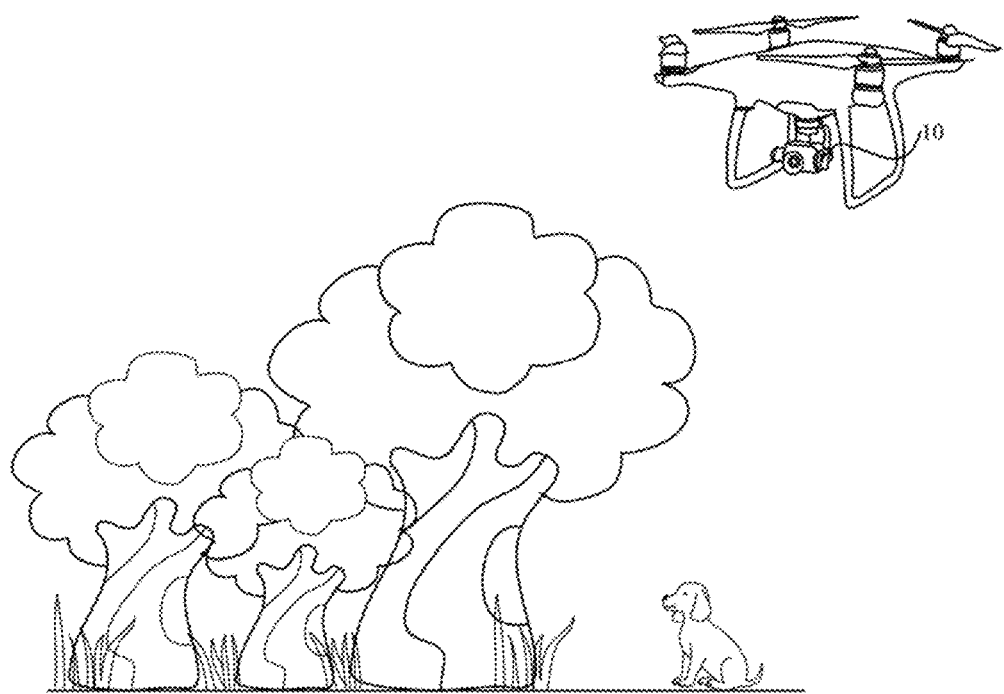
FIG. 1c is a scenic diagram of an image processing method for mobile platform according to one embodiment of the present disclosure.

In one embodiment, the image processing method described above may be applied to a mobile platform as shown in FIG. 1c. Optionally, it may be applied to an unmanned aerial vehicle as shown in FIG. 1c. The mobile platform may include an image acquisition device 10, which may capture image or video and may enable the mobile platform to realize real-time transmission of images or videos based on the above-mentioned image processing method. The image acquisition device 10 captures the image/video, which may be sent to a receiving end through a wireless communication link. To realize the real-time transmission of captured image or video while improving the usage efficiency of a wireless communication link, the mobile platform may divide the image or video captured by the image acquisition device 10 and may differentially transmit images being divided using different frame rates.

In one embodiment, when the mobile platform performs image transmission, it may first acquire the encoding quality evaluation parameter of each macroblock in an encoded historical image and may determine the encoding quality of the historical image based on the encoding quality evaluation parameter of each macroblock in the historical image. Wherein the encoded historical image might be sent to a receiving end through a wireless communication link, the target area image in the encoded historical image may be the image corresponding to the ROI area in the historical image determined by the mobile platform, and the image outside the target area image may be the image corresponding to the non-ROI area in the historical image.

The mobile platform may also acquire the network state evaluation parameter of a wireless communication link for image/video transmission, so that it may determine the network state of the wireless communication link based on the network state evaluation parameter.

Therefore, the mobile platform may determine whether to execute the target area image processing algorithm on the image based on the determined encoding quality of the historical image or the network state of the wireless communication link. The target area image processing algorithm may adopt, for example, a first quantization parameter and a second quantization parameter to respectively encode the target area image and the image outside the target area image in the current image to be encoded; or a first filter and a second filter to respectively filter the target area and the image outside the target area image in the current image to be encoded.

In one embodiment, if the mobile platform determines to execute the target area image processing algorithm on an image, a first quantization parameter and a second quantization parameter may be used to encode a target area image and the image outside the target area image in the current image to be encoded, respectively. Alternatively, a first filter and a second filter may be used to filter the target area image and the image outside the target area image in the current image to be encoded, respectively. If the mobile platform determines not to execute the target area image processing algorithm on the image, it uses the encoding strategy of performing bit rate allocation for the entire frame of the image in the existing technology. When the encoding quality or communication quality is good, the embodiment of the application may not execute the target area image processing algorithm on the image, that is, when the quality of the entire image is relatively high, there is no need to sacrifice the quality of the image outside the target area image to improve the quality of the target area image. When the encoding quality or communication quality is poor, executing the target region image processing algorithm on the image may improve the image quality of the target area image, thereby improving the flexibility of image encoding.

Figure 2:
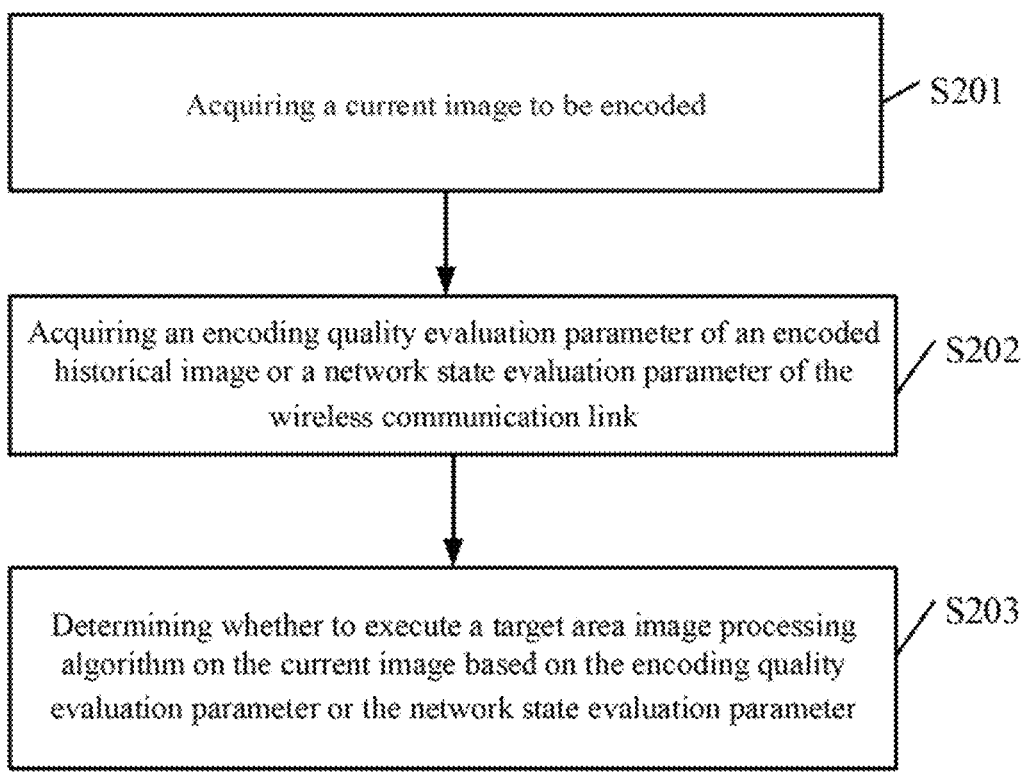
FIG. 2 is a schematic flowchart of an image processing method for mobile platform according to one embodiment of the present disclosure.

Please refer to FIG. 2, which is a schematic flowchart of an image processing method for a mobile platform according to one embodiment of present disclosure. As shown in FIG. 2, the method may include steps S201 to S203.

Step S201 may include acquiring a current image to be encoded. Specifically, the image processing method described above may be executed by an image processing apparatus of a mobile platform, which may communicatively connect with a receiving end through a wireless communication link. The current image to be encoded may be acquired by the image processing apparatus through an image acquisition device mounted on the mobile platform, acquired from a memory of the image processing apparatus, or downloaded by the image processing apparatus through the Internet. The image acquiring source is not limited by the embodiment of this disclosure.

Step S202 may include acquiring an encoding quality evaluation parameter of an encoded historical image or a network state evaluation parameter of a wireless communication link. The image processing apparatus may acquire the encoding quality evaluation parameter of the encoded historical image. The encoding quality evaluation parameter may be used to characterize the encoding quality of an historical image, that is, it may characterize the image quality level of the decoded image corresponding to an encoded historical image. In one embodiment, the encoding quality evaluation parameters may be determined according to one or more of the following: quantization parameter, peak signal-to-noise ratio, mean square error, and structural similarity.

In one embodiment, the historical image may be one or more previous frames of the current image to be encoded.

In one embodiment, the encoding quality evaluation parameter of an encoded historical image may include an average or median value of encoding quality evaluation parameters of the macroblocks in the encoded historical image. In video encoding, an image may be usually divided into several macroblocks, and each macroblock may be composed of a luminance pixel block and two additional chrominance pixel blocks. An image processing apparatus may respectively acquire encoding quality evaluation parameters of macroblocks constituting an encoded historical image and perform average operations on encoding quality evaluation parameters of macroblocks to obtain the encoding quality evaluation parameter of the encoded historical image. Optionally, the image processing apparatus may separately acquire the encoding quality evaluation parameters of macroblocks constituting an encoded historical image and calculate the encoding quality evaluation parameter of each macroblock through a median algorithm to obtain the encoding quality evaluation parameter of the encoded historical image.

In one embodiment, an image processing apparatus may acquire the network state evaluation parameter of a wireless communication link collected by a mobile platform. In some cases, the image processing apparatus may acquire the network state evaluation parameter of the wireless communication link collected by a receiving end. The network state evaluation parameter of the wireless communication link may be any parameter that may reflect the network state of the wireless communication link between the mobile platform and the receiving end. For example, the network state evaluation parameter may be determined according to one or more of the following: the bandwidth, bit error rate, frame rate of the transmitted image, or the data volume of the image in the buffer of the mobile platform to be sent to the receiving end. Furthermore, the network state evaluation parameter may be one or more of the bandwidth, bit error rate, frame rate of transmitted images, or the data volume of the image in the buffer of the mobile platform to be sent to the receiving end.

Step S203 may include determining whether to execute a target area image processing algorithm on the current image according to the encoding quality evaluation parameter or the network state evaluation parameter. Specifically, an image processing apparatus may determine whether the encoding quality of the historical image is lower than a preset encoding quality threshold based on the encoding quality evaluation parameter, or may determine whether the network state of the wireless communication link is lower than a preset communication quality threshold based on the network state evaluation parameter. If it is determined that the encoding quality of the historical image is lower than the preset encoding quality threshold, or the network state of the wireless communication link is lower than the preset communication quality threshold, the image processing apparatus may determine to execute the target area image processing algorithm on the current image. If it is determined that the encoding quality of the historical image is higher or equal to the preset encoding quality threshold, or the network state of the wireless communication link is higher or equal to the preset communication quality threshold, the image processing apparatus may determine not to execute the target area image processing algorithm on the current image.

In one embodiment, a target area processing algorithm may be used to: determine a target area image from the current image; adopt a first quantization parameter to encode the target area image and a second quantization parameter, which is greater than the first quantization parameter, to encode the image outside the target area image in the current image.

In one embodiment, the target area image processing algorithm may be used to determine the size of a target area image based on the flying speed of an unmanned aerial vehicle. For example, a mobile platform is the unmanned aerial vehicle, which pre-stores the corresponding relationship between the range of flight speed and the size of target area image. The unmanned aerial vehicle may acquire its flying speed when an image acquisition device is collecting the current image to be encoded, then may determine the flight speed range to which the flying speed falls into and use the size of the target area image corresponding to the flight speed range as the size of the target area image.

In one embodiment, a target area processing algorithm may be used to: determine the target area image from a current image to be encoded according to a preset composition rule; or acquire motion data indicating the motion of the receiving end and determine the target area image in the current image to be encoded according to the motion data; or acquire information indicating the eyeball rotation of an user wearing the receiving end and determine the target area image in the current image to be encoded according to the information; or acquire composition indication determined according to a user's instruction and determine the target area image in the current image to be encoded according to the composition indication.

The preset composition rule may be, for example, to determine the target area image from the current image according to a preset composition rule, wherein the preset composition rule may be, for example, to use the central area of the image as the target area image based on the composition. Alternatively, the mobile platform may obtain the motion data which may indicate the motion of the receiving end and thus determine the target area image from the current image to be encoded according to the motion data. The motion data indicating the motion of the receiving end may be rotation data of the user's head wearing the receiving end, etc. For example, the receiving end may be a pair of video glasses, and a user wearing the video glasses enables the video glasses to detect the user's head rotation through a built-in motion sensor, to generate the head rotation data, and to send the head rotation data to the mobile platform. The user's interest area in the image may be determined based on the motion data, so that the image in the interest area may be used as the target area image. Alternatively, a receiving end may detect information indicating the eyeball rotation of a user wearing the receiving end and send the eyeball rotation information to a mobile platform. The mobile platform may obtain the eyeball motion information of the user wearing the receiving end and determine the target area image from the current image to be encoded according to the information. The wearable receiving end may be, for example, video glasses, etc. Alternatively, the mobile platform may also obtain a user's composition indication and determine the target area image from the current image to be encoded according to the composition indication. The user's composition instruction may be, for example, selection instruction sent by the user through the receiving end. Thus, the image area targeted by the selection instruction may be used as the target area image.

In one embodiment, a target area processing algorithm may be used to: adopt a first filter to filter the target area image, adopt a second filter to filter the image outside the target area image in the current image, and encode the filtered target area image and the filtered image outside the target area image, wherein the filter strength parameter of the first filter is smaller than that of the second filter.

Optionally, since the target area image and the image outside the target area image are required to correspond to different image quality, a first filter used to filter the target area image is different from a second filter used to filter the image outside the target area image. In some cases, a first filter may be a different type than a second filter; in some cases, the configuration parameter of a first filter may be different from that of a second filter. More specifically, the configuration parameter of the first filter is different from that of the second filter, that is, a filter strength parameter corresponding to the first filter is smaller than a filter strength parameter corresponding to the second filter, wherein the filter strength parameter is used to describe the preservation degree of image details after a filter filters an image. The larger a filter strength parameter, the more details of an image would be lost after being filtered. The filtering strength parameter may be, for example, a spatial distance and/or a gray-scale distance.

In one embodiment, the encoding quality of the historical image may be determined according to the encoding quality evaluation parameter of the historical image. Optionally, if the encoding quality evaluation parameter has a smaller quantization parameter, a larger peak signal-to-noise ratio, a smaller mean square error, and/or a greater structural similarity, it correspondingly determines a higher encoding quality. The network state of the wireless communication link may be determined according to the network state evaluation parameter of the wireless communication link. Optionally, if the network state evaluation parameter includes a higher bandwidth, a smaller bit error rate, a higher frame rate, and/or a smaller data volume of the image in the buffer of the mobile platform to be sent to the receiving end, it correspondingly determines a higher communication quality.

In some embodiments of the present disclosure, after acquisition of the encoding quality evaluation parameter of an encoded historical image or the network state evaluation parameter of a wireless communication link, a mobile platform may determine whether to execute a target area image processing algorithm on a current image to be encoded according to the encoding quality evaluation parameter or the network state evaluation parameter. In this way, an encoding method may be adaptively selected according to the encoding quality evaluation parameter of an encoded historical image or the network state evaluation parameter of a wireless communication link, which may enable the selected encoding method to be more suitable for a current application scenario and improve the flexibility of image encoding.

In one embodiment, based on previous embodiments described above, to explicitly illustrate a method for determining whether the mobile platform may need to execute a target area image processing algorithm on the current image to be encoded. Please refer to FIG. 3, which is an image processing method for a mobile platform according to one embodiment of the present disclosure. The method may include steps S301-S304.

Step S301 may include acquiring a current image to be encoded.

Step S302 may include acquiring the encoding quality evaluation parameter of an encoded historical image or the network state evaluation parameter of a wireless communication link, wherein the encoded historical image being sent to a receiving end via the wireless communication link.

In one embodiment, for the detailed description of S301 and S302, please refer to S201 and S202 in previously described embodiments, which will not be repeated here.

Step S303 may include, when it is determined according to the encoding quality evaluation parameter that the encoding quality of the historical image is lower than a preset encoding quality threshold, or when it is determined according to the network state evaluation parameter that the network state of the wireless communication link is lower than a preset communication quality threshold, it may execute a target area image processing algorithm on a current image.

In one embodiment, the mobile platform may determine the encoding quality based on a quantization parameter (QP) and/or a peak signal-to-noise ratio (PSNR); further, the encoding quality evaluation parameter may be the QP and/or the PSNR. Besides, the mobile platform may determine a network state evaluation parameter based on a bandwidth and/or the data volume of the image in the buffer of a mobile platform to be sent to the receiving end; further, the network state evaluation parameter may be a bandwidth and/or a data volume of the image in the buffer of a mobile platform to be sent to the receiving end.

After the mobile platform determines an encoding quality evaluation parameter, it may determine the encoding quality of the mobile platform according to the encoding quality evaluation parameter. Optionally, the encoding quality evaluation parameter may be determined based on a quantization parameter and/or a peak signal-to-noise ratio. When the encoding quality evaluation parameter is determined based on a quantization parameter, if the quantization parameter is greater than or equal to a preset first quantization parameter, it may determine that the encoding quality is lower than a preset encoding quality threshold; or when the encoding quality evaluation parameter is determined based on a peak signal-to-noise ratio, if the peak signal-to-noise ratio is less than or equal to a preset first peak signal-to-noise ratio threshold, it may determine that the encoding quality is lower than the preset encoding quality threshold. When the encoding quality evaluation parameter is determined according to the quantization parameter, if the quantization parameter is less than a preset second quantization parameter threshold, it may determine that the encoding quality is higher than or equal to a preset encoding quality threshold; or when the encoding quality evaluation parameter is determined based on the peak signal-to-noise ratio, if the peak signal-to-noise ratio is greater than a preset second peak signal-to-noise ratio threshold, it may determine that the encoding quality is higher than or equal to the preset encoding quality threshold.

After the mobile platform determines a network state evaluation parameter, it may determine the network state of the wireless communication link according to the network state evaluation parameter. Optionally, the network state evaluation parameter may be determined based on the bandwidth of the wireless communication link and the data volume of the image in the buffer of the mobile platform to be sent to the receiving end. When the network state evaluation parameter is determined based on the bandwidth, if the bandwidth is less than or equal to a preset first bandwidth threshold, it may determine that the communication quality is lower than a preset communication quality threshold; or when the network state evaluation parameter is determined based on the data volume, if the data volume is greater than or equal to a preset first data volume threshold, it may determine that the communication quality is lower than the preset communication quality threshold. When the network state evaluation parameter is determined based on the bandwidth, if the bandwidth is greater than a preset second bandwidth threshold, it may determine that the communication quality is higher than or equal to a preset communication quality threshold; or when the network state evaluation parameter is determined based on the data volume, if the data volume is less than a preset second data volume threshold, it may determine that the communication quality is higher than or equal to the preset communication quality threshold.

Step S304 may include, when it is determined according to a encoding quality evaluation parameter that the encoding quality of the historical image is higher than or equal to a preset encoding quality threshold, or when it is determined according to the network state evaluation parameter that the network state of the wireless communication link is higher than or equal to a preset communication quality threshold, it may not execute a target area image processing algorithm on the current image.

In one embodiment, if it is determined not to execute a target area image processing algorithm on the current image, it may use an encoding strategy of performing bit rate allocation for the entire frame of the current image to be encoded in the prior art. When it has been determined that the encoding quality of the historical image is higher than or equal to a preset encoding quality threshold or that the network state of the wireless communication link is higher than or equal to a preset communication quality threshold, in this case, it may not be necessary to sacrifice the image quality outside the target area image to improve the image quality of the target area. An encoding strategy of performing bit rate allocation for the entire frame of the image may be adopted to encode the image.

In some embodiments of the present disclosure, after the mobile platform acquiring a encoding quality evaluation parameter of an encoded historical image or a network state evaluation parameter of a wireless communication link, when determining according to an encoding quality evaluation parameter that the encoding quality of the historical image is lower than a preset encoding quality threshold or determining according to the network state evaluation parameter that the network state of the wireless communication link is lower than a preset communication quality threshold, it may execute a target area image processing algorithm on a current image. In this way, it may guarantee the quality and definition of the target area image in the current image. If it is determined according to an encoding quality evaluation parameter that the encoding quality of the historical image is higher than or equal to a preset encoding quality threshold or it is determined according to a network statue evaluation parameter that the network state of the wireless communication link is higher than or equal to a preset communication quality threshold, it may not be necessary to sacrifice the image quality of the image outside the target area image to improve the image quality of the target area image, which may effectively improve the image quality of the decoded image. Thus, it may effectively improve the flexibility of image processing.

Figure 4:
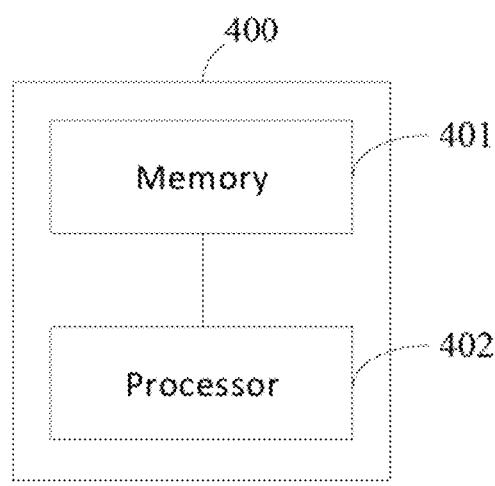
FIG. 4 is a schematic block diagram of a mobile platform according to one embodiment of the present disclosure.

One embodiment of the present disclosure provides an image processing apparatus, which may be applied to a mobile platform. FIG. 4 is a structural diagram of an image processing apparatus for a mobile platform according to one embodiment of the present disclosure. As shown in FIG. 4, the image processing apparatus 400 for a mobile platform may comprise a memory 401 and a processor 402, wherein the memory 402 may store program codes and the processor 402 may call program codes in the memory. When the program codes are executed, the processor 402 may perform the following operations: acquire the encoding quality evaluation parameter of the image outside the target area image in an encoded historical image, wherein the encoded historical image being sent to a receiving end through a wireless communication link; acquire a current image to be encoded; acquire the encoding quality evaluation parameter of an encoded historical image or the network state evaluation parameter of a wireless communication link, wherein the encoded historical image being sent to the receiving end through the wireless communication link; and determine whether to execute a target area image processing algorithm on the current image according to the encoding quality evaluation parameter or the network state evaluation parameter;

Optionally, the target area image processing algorithm may be used to: determine a target area image from the current image, use a first quantization parameter to encode the target area image, and use a second quantization parameter greater than the first quantization parameter to encode the image outside the target area image in the current image. Alternatively, the target area image processing algorithm may be used to: adopt a first filter to filter the target area image, adopt a second filter to filter the image outside the target area image in the current image, and encode the filtered target area image and the filtered image outside the target area, wherein the filter strength parameter of the first filter is smaller than that of the second filter.

In one embodiment, the network state evaluation parameter may comprise at least one of the following: the bandwidth of the wireless communication link and the data volume of the image in the buffer of the mobile platform to be sent to the receiving end.

In one embodiment, the network state evaluation parameter may comprise the bandwidth of the wireless communication link, wherein:

when the processor 402 determines whether to execute a target area image processing algorithm on the current image according to the encoding quality evaluation parameter or the network state evaluation parameter, it may perform the following operation:

when the bandwidth is less than or equal to a preset first bandwidth threshold, it may determine to execute the target area image processing algorithm on the current image.

In one embodiment, the processor 402 may determine whether to execute a target area image processing algorithm on the current image according to the encoding quality evaluation parameter or the network state evaluation parameter, and may further perform the following operation:

when the bandwidth is greater than a preset second bandwidth threshold, it may determine not to execute the target area image processing algorithm on the current image.

In one embodiment, the network state evaluation parameter may comprise the data volume of the image in the buffer of the mobile platform to be sent to the receiving end, wherein, when the processor 402 determines whether to execute a target area image processing algorithm on the current image according to the encoding quality evaluation parameter or the network state evaluation parameter, it may perform the following operation:

when the data volume is greater than or equal to a preset first data volume threshold, it may determine to execute the target area image processing algorithm on the current image.

In one embodiment, the processor 402 may determine whether to execute a target area image processing algorithm on the current image according to the encoding quality evaluation parameter or the network state evaluation parameter, and may further perform the following operation:

when the data volume is less than a preset second data volume threshold, it may determine not to execute the target area image processing algorithm on the current image.

In one embodiment, the encoding quality evaluation parameter may be determined according to one or more of the following: Quantization Parameter (QP), Peak Signal-to-Noise Ratio (PSNR), Mean Square Error (MSE), and Structural Similarity Index (SSIM).

In one embodiment, the historical image may comprise one or more previous frames of the current image.

In one embodiment, the encoding quality evaluation parameter of the encoded historical image may include an average or median value of the encoding quality evaluation parameters of macroblocks in the encoded historical image.

In one embodiment, the encoding quality evaluation parameter may include a quantization parameter, wherein, when the processor 402 determines whether to execute a target area image processing algorithm on the current image according to the encoding quality evaluation parameter or the network state evaluation parameter, it may perform the following operation:

when the quantization parameter is greater than or equal to a preset first quantization parameter threshold, it may be determined to execute the target region image processing algorithm on the current image.

In one embodiment, the processor 402 may determine whether to execute a target area image processing algorithm on the current image according to the encoding quality evaluation parameter or the network state evaluation parameter, and may further perform the following operation:

when the quantization parameter is less than a preset second quantization parameter threshold, it may be determined not to execute the target area image processing algorithm on the current image.

In one embodiment, the encoding quality evaluation parameter may include a peak signal-to-noise ratio, wherein, when the processor 402 determines whether to execute a target area image processing algorithm on the current image according to the encoding quality evaluation parameter or the network state evaluation parameter, it may perform the following operation:

when the peak signal-to-noise ratio is less than or equal to a preset first peak signal-to-noise ratio threshold, it may be determined to execute the target area image processing algorithm on the current image.

In one embodiment, the processor 402 may determine whether to execute a target area image processing algorithm on the current image according to the encoding quality evaluation parameter or the network state evaluation parameter, and may further perform the following operation:

when the peak signal-to-noise ratio is greater than a preset second peak signal-to-noise ratio threshold, it may be determined not to execute the target area image processing algorithm on the current image.

In one embodiment, the filter intensity parameter may comprise a spatial distance and/or a gray-scale distance.

In one embodiment, the target area image processing algorithm may be used to determine the size of a target area image according to the flying speed of an unmanned aerial vehicle.

In one embodiment, the target area image processing algorithm may be used to: determine the target area image from the current image to be encoded according to a preset composition rule, or acquire motion data indicating the motion of the receiving end and determine the target area image from the current image to be encoded according to the motion data, or acquire information used to indicate the eyeball rotation of a user wearing the receiving end and determine the target area image from the current image to be encoded according to the information, or acquire a composition instruction determined according to a user's indication and determine the target area image from the current image to be encoded according to the composition instruction.

Figure 3:
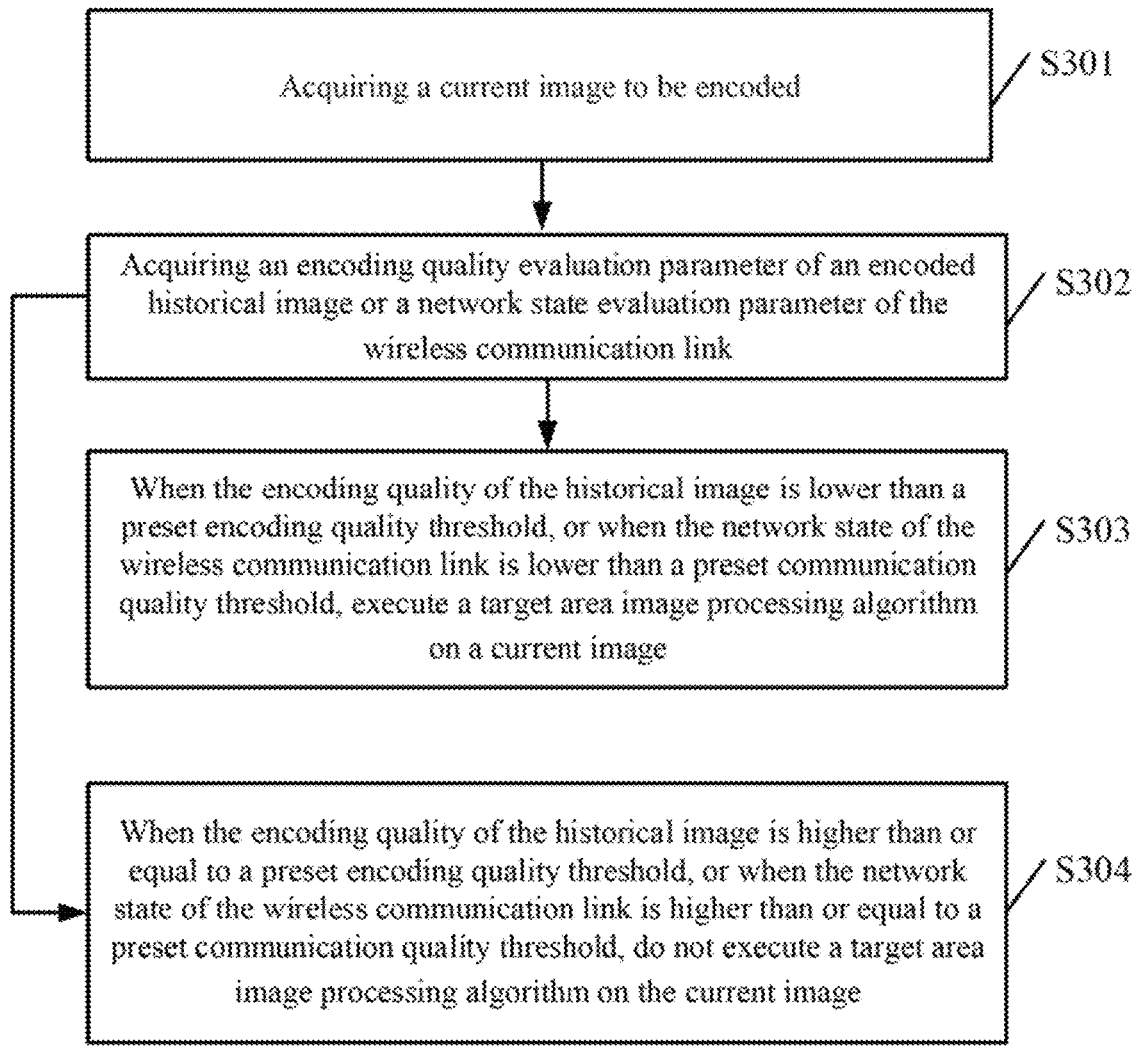
FIG. 3 is a schematic flowchart of an image processing method for mobile platform according to one embodiment of the present disclosure.

Some embodiments of the present disclosure provide an image processing apparatus for a mobile platform, which may execute an imaging process method described in previous embodiments, as shown in FIGS. 2 and 3. Its execution method and beneficial effects are similar, which will not be repeated here.

Some embodiments of the present disclosure provide a mobile platform, which may comprise a fuselage, a power system, a communication device, and an image processing apparatus previously described. The image processing apparatus of a mobile platform works the same as or similarly to previous description, which will not be repeated here. The power system, installed in the fuselage, may be used to provide power for the mobile platform. The communication device, installed in the fuselage, may be used to establish the wireless communication link with a receiving end. When the mobile platform is an unmanned aerial vehicle (UAV), its power system may include a rotor, a motor that may drive the rotor to rotate, and an electric regulator. The UAV may be a four-rotor, six-rotor, eight-rotor, or other multi-rotor UAV, wherein the UAV may take off and land vertically to work. It is understandable that the UAV may also be a fixed-wing or a hybrid-wing mobile platform.

In one embodiment, the mobile platform may further comprise: an image acquisition device, installed in the fuselage, which may be used for acquiring a current image to be encoded.

In one embodiment, the mobile platform may comprise at least one of the following: an auto and an UAV.

Some embodiments of the present disclosure further provides a computer-readable storage medium on which a computer program is stored. When the computer program is executed by a processor, the steps of the image processing method as in any of the above embodiments are implemented, and thus have all the beneficial technical effects of the image processing method, which will not be repeated herein for conciseness.

The computer-readable storage medium may be an internal storage unit of the mobile platform described in any of the foregoing embodiments, such as a hard disk or a memory of the mobile platform. The computer-readable storage medium may also be an external storage device of the mobile platform, such as a plug-in hard disk, a smart media card (SMC), and a secure digital (SD) card, a flash card, etc., equipped on mobile platform.

The computer readable storage medium may be a tangible device that can store programs and instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer program, program instructions and/or program codes described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer program/program instructions/program codes for storage in a computer readable storage medium within the computing or processing device.

The computer program, program instructions and/or program codes for carrying out operations of the present disclosure may include machine language instructions and/or microcode, which may be compiled or interpreted from source code written in any combination of one or more programming languages, including assembly language, Basic, Fortran, Java, Python, R, C, C++, C#, or similar programming languages. the computer program/program instructions/program codes may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer program/program instructions/program codes by using information from the computer program/program instructions/program codes to configure or customize the electronic circuitry, in order to perform aspects of the present disclosure.

The computer program, program instructions and/or program codes that may implement the device/systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. The computer program/program instructions/program codes may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer program, program instructions and/or program codes may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The processor may be circuitry, or one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

The memory and non-volatile storage medium may be computer-readable storage media. The memory may include any suitable volatile storage devices such as dynamic random access memory (DRAM) and static random access memory (SRAM). The non-volatile storage medium may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

The program may be a collection of machine readable instructions and/or data that is stored in non-volatile storage medium and is used to create, manage, and control certain software functions that are discussed in detail elsewhere in the present disclosure and illustrated in the drawings. In some embodiments, the memory may be considerably faster than the non-volatile storage medium. In such embodiments, the program may be transferred from the non-volatile storage medium to the memory prior to execution by a processor.

Each part of the present disclosure may be implemented by hardware, software, firmware, or a combination thereof. In the above exemplary embodiments, multiple steps or methods may be implemented by hardware or software stored in a memory and executed by a suitable instruction execution system.

Unless otherwise defined, all technical and scientific terms used herein have the same meaning as commonly understood by those skilled in the technical field of the present disclosure. The terms used herein are only for the purpose of describing specific embodiments and are not intended to limit of the disclosure. As used in this disclosure and the appended claims, the singular forms "a," "an," and "the" are intended to include the plural forms as well, unless the context clearly indicates otherwise. It should also be understood that the term "and/or" as used herein refers to and encompasses any or all possible combinations of one or more associated listed items. Terms such as "connected" or "linked" are not limited to physical or mechanical connections, and may include electrical connections, whether direct or indirect. Phrases such as "a plurality of," "multiple," or "several" mean two and more.

It should be noted that in the instant disclosure, relational terms such as "first" and "second", etc. are used herein merely to distinguish one entity or operation from another entity or operation without necessarily requiring or implying any such actual relationship or order between such entities or operations. The terms "comprise/comprising", "include/including", "has/have/having" or any other variants thereof are intended to cover non-exclusive inclusion, so that a process, method, article, or device that includes a series of elements includes not only those elements, but also other elements that are not explicitly listed, or also includes elements inherent to such processes, methods, articles, or equipment. If there are no more restrictions, the element defined by the phrase, such as "comprising a . . . ", "including a . . . " does not exclude the presence of additional identical elements in the process, method, article, or equipment that includes the element.

Finally, it should be noted that the above embodiments/examples are only used to illustrate the technical features of the present disclosure, not to limit them; although the present disclosure has been described in detail with reference to the foregoing embodiments and examples, those of ordinary skill in the art should understand that: the technical features disclosed in the foregoing embodiments and examples can still be modified, some or all of the technical features can be equivalently replaced, but, these modifications or replacements do not deviate from the spirit and scope of the disclosure.

What is claimed is:

1. An image processing method for a mobile platform communicatively connected with a receiving end through a wireless communication link, comprising:

acquiring a current image to be encoded;

acquiring an encoding quality evaluation parameter of an encoded historical image or a network state evaluation parameter of the wireless communication link, wherein the encoded historical image being sent to the receiving end through the wireless communication link; and determining whether to execute a target area image processing algorithm on the current image based on the encoding quality evaluation parameter or the network state evaluation parameter, wherein the target area image processing algorithm is configured to determine a target area image from the current image, use a first quantization parameter to encode the target area image, and use a second quantization parameter greater than the first quantization parameter to encode an image outside the target area image in the current image; or the target area image processing algorithm is configured to adopt a first filter to filter the target area image, adopt a second filter to filter the image outside the target area image in the current image, and encode the filtered target area image and the filtered image outside the target area image, a filter strength parameter of the first filter being smaller than that of the second filter.

2. The image processing method of claim 1, wherein the network state evaluation parameter comprises at least one of a bandwidth of the wireless communication link or data volume of the encoded historical image in a buffer of the mobile platform to be sent to the receiving end.

3. The image processing method of claim 2, wherein the network state evaluation parameter comprises the bandwidth of the wireless communication link, and the determining whether to execute the target area image processing algorithm on the current image based on the encoding quality evaluation parameter or the network state evaluation parameter comprises:
when the bandwidth is less than or equal to a preset first bandwidth threshold, determining to execute the target area image processing algorithm on the current image.

4. The image processing method of claim 3, wherein the determining whether to execute the target area image processing algorithm on the current image according to the encoding quality evaluation parameter or the network state evaluation parameter further comprises:
when the bandwidth is greater than a preset second bandwidth threshold, determining not to execute the target area image processing algorithm on the current image.

5. The image processing method of claim 2, wherein the network state evaluation parameter comprises the data volume of the encoded historical image in the buffer of the mobile platform to be sent to the receiving end, and the determining whether to execute the target area image processing algorithm on the current image based on the encoding quality evaluation parameter or the network state evaluation parameter comprises:
when the data volume is greater than or equal to a preset first data volume threshold, determining to execute the target area image processing algorithm on the current image.

6. The image processing method of claim 5, wherein the determining whether to execute the target area image processing algorithm on the current image based on the encoding quality evaluation parameter or the network state evaluation parameter further comprises:
when the data volume is less than a preset second data amount threshold, determining not to execute the target area image processing algorithm on the current image.

7. The image processing method of claim 1, wherein the encoding quality evaluation parameter comprises one or more of quantization parameter (QP), peak signal-to-noise ratio (PSNR), mean square error (MSE), or structure similarity (SSIM).

8. The image processing method of claim 1, wherein the encoded historical image comprises one or more previous frames of the current image.

9. The image processing method of claim 1, wherein the encoding quality evaluation parameter of the encoded historical image comprises an average or median value of encoding quality evaluation parameters of macroblocks in the encoded historical image.

10. The image processing method of claim 7, wherein the encoding quality evaluation parameter comprises the quantization parameter, and the determining whether to execute the target area image processing algorithm on the current image based on the encoding quality evaluation parameter or the network state evaluation parameter comprises:
when the quantization parameter is greater than or equal to a preset first quantization parameter threshold, determining to execute the target area image processing algorithm on the current image.

11. The image processing method of claim 10, wherein the determining whether to execute the target area image processing algorithm on the current image based on the encoding quality evaluation parameter or the network state evaluation parameter further comprises:
when the quantization parameter is less than a preset second quantization parameter threshold, determining not to execute the target area image processing algorithm on the current image.

12. The image processing method of claim 7, wherein the encoding quality evaluation parameter comprises the peak signal-to-noise ratio, and the determining whether to execute the target area image processing algorithm on the current image based on the encoding quality evaluation parameter or the network state evaluation parameter comprises:
when the peak signal-to-noise ratio is less than or equal to a preset first peak signal-to-noise ratio threshold, determining to execute the target area image processing algorithm on the current image.

13. The image processing method of claim 12, wherein the determining whether to execute the target area image processing algorithm on the current image based on the coding quality evaluation parameter or the network state evaluation parameter further comprises:
when the peak signal-to-noise ratio is greater than a preset second peak signal-to-noise ratio threshold, determining not to execute the target area image processing algorithm on the current image.

14. The image processing method of claim 1, wherein the filter strength parameter comprises a spatial distance and/or a gray-scale distance.

15. The image processing method of claim 1, wherein the target area image processing algorithm is further configured to determine a size of the target area image based on a flight speed of the mobile platform, which is an unmanned aerial vehicle, and a pre-stored corresponding relationship between ranges of the flight speed and sizes of the target area image.

16. The image processing method of claim 1, wherein the target area image processing algorithm is configured to:
determine the target area image from the current image to be encoded according to a preset composition rule;
acquire motion data indicating motion of the receiving end and determine the target area image from the current image to be encoded according to the motion data;
acquire information indicating eyeball rotation of a user wearing the receiving end and determine the target area image from the current image to be encoded according to the information indicating eyeball rotation of the user wearing the receiving end; or,
acquire a composition instruction determined according to a user's instruction and determine the target area image from the current image to be encoded according to the composition instruction.

17. An image processing apparatus for a mobile platform communicatively connected with a receiving end through a wireless communication link, comprising a memory and a processor, wherein:
the memory stores program codes;
the processor, which calls the program codes in the memory, while the program codes are executed, performing the following steps:
acquiring a current image to be encoded;
acquiring an encoding quality evaluation parameter of an encoded historical image or a network state evaluation parameter of a wireless communication link, wherein the encoded historical image being sent to the receiving end through the wireless communication link; and determining whether to execute a target area image processing algorithm on the current image based on the encoding quality evaluation parameter or the network state evaluation parameter, wherein the target area image processing algorithm is configured to determine a target area image from the current image, adopt a first quantization parameter to encode the target area image, and adopt a second quantization parameter greater than the first quantization parameter to encode an image outside the target area image in the current image; or the target area image processing algorithm is configured to adopt a first filter to filter the target area image, adopt a second filter to filter the image outside the target area image in the current image, and encode the filtered target area image and the filtered image outside the target area image, a filter strength parameter of the first filter being smaller than that of the second filter.

18. The image processing apparatus of claim 17, wherein the encoding quality evaluation parameter comprises one or more of quantization parameter (QP), peak signal-to-noise ratio (PSNR), mean square error (MSE), or structure similarity (SSIM).

19. The image processing apparatus of claim 17, wherein the encoded historical image includes one or more previous frames of the current image.

20. A mobile platform, comprising the image processing apparatus of claim 17.

* * * * *